Patented Oct. 24, 1950

2,527,057

UNITED STATES PATENT OFFICE 2,527,057

JUTE FIBER-COATING RESINOUS MATERIAL AND PROCESS OF MAKING SAME

William B. Canfield, Montclair, N. J., assignor, by direct and mesne assignments, of one-half to Montclair Research Corporation, a corporation of New Jersey, and one-half to Ellis-Foster Company, a corporation of New Jersey No Drawing. Application January 8, 1948, Serial No. 1,271

4 Claims. (Cl. 260—22)

The present invention relates to a resinous coating composition for jute fibers and to the process of making the same. More particularly, it relates to a resinous coating composition which, in addition to imparting a sizing or bodying effect to the yarn, produces flexibility and yet gives the yarn a non-tacky feel.

It is the object of the present invention to provide a jute fiber-coating composition, preferably in emulsion form, which will impart a sizing effect, good flexibility, and yet be non-heat-hardenable after evaporation of the aqueous solvent from the coated fibers.

It is a further object of the present invention to provide a jute fiber-coating composition which will impart a high degree of alkali resistance, and water resistance to the yarn.

It is a still further object of the present invention to provide a jute fiber-coating composition which may be applied readily to the fibers in the form of an emulsion and which, after removal of the solvent at substantially low temperatures of 60° C.–120° C. in a continuous operation of perhaps 5 to 15 minutes, will impart a permanent size or body to the fiber, and which will be resistant to further changes such as after-brittleness or after-curing upon ageing.

Thus it may be observed that a practical and useful coating size for jute yarn must possess the properties of being dried on the fiber at low temperatures for very short periods of time, of having good alkali and water resistance, and finally being inert to the harmful property of after-cure on ageing.

The objects of the present invention are, therefore, secured by a modified alkyd resin which has been tailored within certain specific limits of acid number and softening or melting point.

The resinous products are prepared by heating together rosin, tall oil, and pentaerythritol in a suitable reactor at 200° C.–300° C. for 3 to 4 hours to form a substantially neutral partial or hydroxyl-containing ester. Finally a mixture of polycarboxylic acids (maleic anhydride and phthalic anhydride) is added and heating continued at 250° C.–300° C. until the resulting alkyd resin possesses an acid number of 10–20 and a ring and ball softening point range of 80° C.–90° C.

The alkyd resin, thus produced, is emulsified in the following manner. The alkyd resin, (together with a hydrocarbon solvent, such as xylene to reduce the viscosity of the resin) and oleic acid are warmed together to 70° C.–100° C. and an aqueous solution of ammonium hydroxide added while rapidly agitating with a high-speed stirrer to form a homogeneous emulsion which air-dries to a clear, flexible, tack-free film. These dried films may be immersed in tap-water for 24 hours without being affected.

Jute fibers in the form of a spun yarn are passed through the emulsion under a slight tension and, after stripping off excess emulsion, finally passed through a long drying chamber through which a current of dry air passes at a temperature of 80° C.–100° C. The yarn is held at this temperature for 5 to 15 minutes to secure a yarn coated with 30% to 50% resin, which is glossy, non-tacky, and extremely flexible, thus permitting it to be woven readily with other untreated fibers into rug backings.

It will be immediately apparent that a coating composition of carefully controlled properties must be provided to meet the specific requirements of good water-resistance, non-tackiness and good flexibility when applied to the yarn.

In the preparation of the alkyd resin to secure these heretofore mentioned properties, I prefer to employ a polyhydric alcohol-polycarboxylic acid resin which has been modified with a mixture of free fatty acids and rosin acids such as those present in the commercial grades of tall oil. Such resins have been found to give a flexible coating to the jute fibers, but leave a residual tack to the fibers. In addition to this serious fault, practical variation of the formulation to eliminate tack, namely, decreasing the tall oil ratio and increasing the polycarboxylic acid gives tack-free coatings which are hard and show a tendency to become brittle when aged. It has been found that the use of rosin as a substitute for part of the tall oil in sufficient proportions will eliminate the tackiness and any tendency toward brittleness during ageing and also maintain the desired degree of flexibility.

Thus, in the preparation of the alkyd resin to secure these heretofore mentioned properties, I prefer to employ a composition which consists of the reaction product of substantially equal molar amounts of pentaerythritol, polycarboxylic acid, tall oil, and rosin. It will be immediately apparent to those skilled in the art that the proportions of these substances may be varied over a fairly wide range and still secure a modified alkyd resin. However, the given range of 80°–90° C. for softening point is critical, as the properties of the coated yarn are thereby successfully controlled. I prefer to use one mole of a mixture of polycarboxylic acids which consists of 80%–95% phthalic anhydride and 5%–

20% maleic anhydride, since the presence of a small amount of maleic anhydride serves the purpose of hardening the resin without causing undue heat-sensitivity. I may employ fumaric acid, itaconic anhydride, citraconic anhydride, and the like in the proportions given for maleic anhydride and still achieve substantially the same result. Although I prefer to employ one mole each of tall oil and rosin, the exact proportions of each will be dependent upon the composition of the tall oil. Since the acidic constituents of tall oils vary rather widely in proportion of rosin acids to free fatty acids, depending upon the source of supply, I prefer to employ proportions of gum rosin to tall oil such that the combination of the two will be 2 molar equivalents of monocarboxylic acid in approximate percentages of 30–40% free fatty acids to 60–70% rosin acids, the molecular weight of both tall oil and rosin being taken as 300 for purposes of calculation. Variations outside of these proportions tend to show tackiness where more free fatty acids are employed and hardness or dryness of the coated yarn where higher percentages of rosin and rosin acids are employed. In place of rosin, I may employ certain grades of commercially available hydrogenated rosin or polymerized rosin. However, since these products are high in price, they do not improve the economics involved in production of these resins.

In place of pentaerythritol, I may also employ other polyhydric alcohols such as glycerol, sorbitol, dipentaerythritol and the like. It is to be understood, however, that such a variation in the polyhydric alcohol involves an adjustment of the relative proportions of dicarboxylic acid, tall oil, and rosin set forth above to secure a resin of desired properties.

In the formulation of the resinous emulsion for application to spun jute fibers, it is preferable that a straight resin emulsion be employed. The use of a small amount of hydrocarbon solvent tends to soften the resin somewhat thus making emulsification easier. Emulsifying agents such as ammonium oleate, triethanolamine oleate and the like may be employed. Also, for certain particular applications the incorporation of small amounts of casein or methyl cellulose in the form of the aqueous solution is advantageous in amounts of 1% to 10% based on the alkyd resin. The presence of such stabilizers in these emulsions in substantially more than 2% tends to reduce the water resistance of the coated yarn.

It will be apparent that various selected plasticizers may be incorporated with the resin or blended with the resinous emulsion to modify the properties of the coated yarn over a wide degree. For certain uses, particularly in coating spun rayon yarn a greater flexibility may be secured by incorporating small percentages of latex type emulsions.

While the products of the present invention are to be mainly utilized in the coating or sizing of spun jute fiber, they can be applied to other yarns, such as spun rayon yarns, cotton and the like, thus adding weight to the yarn and giving the so treated yarns a substantially wider range of usefulness. Moreover, it will be apparent that these resinous coatings may be employed in emulsion paints, shoe polishes, and the like, thus further extending their field of usefulness.

The following examples are given by way of illustration only and should not be considered to limit the scope of the invention. All proportions in the examples are in parts by weight.

*Example 1*

116 parts (0.8 mole) of pentaerythritol, 240 parts (0.8 mole) of refined tall oil (containing about 5% stearols or high alcohols, 60% free fatty acids, and 35% rosin acids), and 240 parts (0.8 mole) of gum rosin are heated together in a one-liter 3-neck flask equipped with a thermometer, stirrer, and 4-pear distilling column leading to a water-cooled condenser and water-trap for 3 hours at 275°–280° C. The reaction mixture is cooled to 100° C. and 103.6 parts (0.7 mole) of phthalic anhydride and 9.8 parts (0.1 mole) of maleic anhydride added. Heating is thereafter continued at 250°–270° C. for 11 hours. A hard brittle resin is thus secured which possesses an acid number of 17.6 and a ring and ball softening point of 83° C.

50 parts of the above resin, 30 parts of benzene, and 2.5 parts of oleic acid are warmed together to form a clear solution at 80° C. While rapidly agitating same, 10 parts of a 10% aqueous methylcellulose solution, 0.7 part of ammonium oleate, and 45 parts of water are added to secure at room temperature a homogeneous emulsion containing 40% solids. The resinous emulsion was applied to spun jute yarn, and placed in an oven at 100° C. for 5 minutes. A non-tacky flexible coating was thus imparted to the yarn.

*Example 2*

540 parts (4 moles) of pentaerythritol, 1200 parts (4 moles) of refined tall oil as in Example 1, and 1200 parts (4 moles) of gum rosin are heated together at 250–260° C. for 8 hours in a large stainless steel bucket. 444 parts (3 moles) of phthalic anhydride and 98 parts (1 mole) of maleic anhydride are added and heating continued at 200° C.–210° C. for 4 hours, and finally at 250°–260° C. for 15 hours. A hard brittle resin is thus obtained which has an acid number of 14.2 and a ring and ball softening point of 85° C.

An emulsion of this resin prepared following the procedure set forth in Example 1 air-dried on a glass plate to a clear, non-tacky film in 4 hours. The dried film was water insensitive.

*Example 3*

232 parts (1.6 moles) of pentaerythritol, 500 parts (1.67 moles) of gum rosin, and 460 parts (1.53 moles) of refined tall oil as in Example 1 are heated together in a 2-liter 3-neck flask equipped with a thermometer, stirrer, and 4-pear column attached directly to a water-cooled condenser and water-trap at 270°–280° C. for 4 hours. 207.2 parts (1.4 moles) of phthalic anhydride and 19.6 parts (0.2 mole) of maleic anhydride are added and heating continued at 250°–260° C. for 16 hours. A light-colored clear resin is secured having an acid number of 17.6 and a ring and ball softening point of 85° C.

*Example 4*

232 parts (1.6 moles) of pentaerythritol, 480 parts (1.6 moles) of refined tall oil as in Example 1, and 480 parts (1.6 moles) of gum rosin are heated together in a 2-liter 3-neck flask equipped with a thermometer, stirrer, and 4-pear column attached directly to a water-cooled condenser and water-trap at 270°–280° C. for 4 hours. 177.6 parts (1.2 moles) of phthalic anhydride and 39.2 parts (0.4 mole) of maleic anhydride are added and heating continued at 250°–260° C. 14½ hours.

A light-colored clear resin results of acid number 16.1 and ring and ball softening point of 82° C.

Example 5

232 parts of pentaerythritol, 640 parts of a commercial tall oil (having approximately 44% fatty acids, 50% rosin acids and 6% unsaponifiable materials), and 320 parts of gum rosin are heated together in a 2-liter, 3-neck flask equipped with a thermometer, stirrer, and 4-pear distilling column attached directly to a water-cooled condenser and water-trap. Heating is carried out at 270°–280° C. for 4 hours. The resulting reaction product is cooled to 100° C. and 207.2 parts of phthalic anhydride and 19.6 parts of maleic anhydride added. Heating is thereafter continued at 250°–260° C. for 10½ hours.

A light-colored clear resin is secured which is soluble in hydrocarbon solvents and possesses a ring and ball softening point of 84° C. The resin may be readily emulsified following the procedure set forth in Example 1.

I claim:

1. An emulsifiable composition adapted to deposit a non-tacky flexible coating on jute yarn, comprising the permanently fusible resinous reaction product, having an acid number of 10 to 20, and a softening point of 80° to 90° C., obtained by heating, at between 250° C. and 300° C., 1 mole of pentaerythritol, 2 moles of a mixture of tall oil and rosin, and 1 mole of a mixture of phthalic anhydride and maleic anhydride, the mixture of tall oil and rosin comprising 30% to 40% fatty acids and 70% to 60% rosin acids, and the mixture of phthalic and maleic anhydride comprising from 80% to 95% phthalic and between 20% and 5% maleic anhydride.

2. An emulsifiable composition adapted to deposit a non-tacky flexible coating on jute yarn, comprising the permanently fusible resinous reaction product, having an acid number of 10 to 20, and a softening point of 80° to 90° C., obtained by heating, at between 250° C. and 300° C., 1 mole of pentaerythritol, 2 moles of a mixture of tall oil and rosin comprising 30% to 40% fatty acids and 70% to 60% total rosin acids, 0.9 mole phthalic anhydride and 0.1 mole maleic anhydrided.

3. An emulsion comprising an aqueous phase and the resinous reaction product of claim 1.

4. The process of making an emulsifiable resinous reaction product adapted for application to jute yarn to produce a non-tacky flexible deposit thereon, which comprises heating, at between 200° and 300° C., 1 molar quantity of pentaerythritol and 2 molar quantities of a mixture of rosin and tall oil comprising from 30% to 40% fatty acids and from 70% to 60% rosin acids, until a substantially neutral hydroxyl-containing ester is obtained, and then adding 1 molar quantity of a mixture of phthalic and maleic anhydrides comprising from 80% to 95% phthalic and between 20% and 5% maleic anhydride, and heating at from 250° to 300° C. until the resulting alkyd resin has an acid number of 10 to 20 and a softening point of 80° to 90° C.

WILLIAM B. CANFIELD.

REFERENCES CITED

The following references are of record in the file of this patent:

UNITED STATES PATENTS

| Number | Name | Date |
|---|---|---|
| 2,194,894 | Ellis | Mar. 26, 1940 |
| 2,235,507 | Strauch | Mar. 18, 1941 |